US011156122B2

(12) United States Patent
Kupratis (10) Patent No.: US 11,156,122 B2
(45) Date of Patent: *Oct. 26, 2021

(54) AIRFOIL COOLING SYSTEM (71) Applicant: UNITED TECHNOLOGIES CORPORATION, Farmington, CT (US)

(72) Inventor: Daniel Bernard Kupratis, Wallingford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/012,331

(22) Filed: Jun. 19, 2018

(65) Prior Publication Data
US 2019/0383165 A1 Dec. 19, 2019

(51) Int. Cl.
F01D 25/12 (2006.01)
F01D 9/04 (2006.01)
F02C 6/00 (2006.01)

(52) U.S. Cl.
CPC .............. F01D 25/12 (2013.01); F01D 9/041 (2013.01); F02C 6/00 (2013.01); F05D 2220/3212 (2013.01); F05D 2240/121 (2013.01); F05D 2260/20 (2013.01)

(58) Field of Classification Search
CPC .......... F01D 5/186; F01D 5/187; F01D 5/188; F01D 25/12; F01D 9/041; F01D 9/06; F01D 9/065; F02C 6/00; F02C 6/02; F02C 6/08; F02C 3/13; F02C 9/18
See application file for complete search history.

(56) References Cited

U.S. PATENT DOCUMENTS

| 3,533,712 A | * | 10/1970 | Kercher | F01D 5/20 416/92 |
| 5,498,126 A | * | 3/1996 | Pighetti | F01D 9/065 415/115 |
| 2010/0326085 A1 | | 12/2010 | Veilleux | |
| 2013/0251508 A1 | * | 9/2013 | Tardif | F01D 9/02 415/115 |
| 2016/0169514 A1 | * | 6/2016 | Eastwood | F23R 3/04 60/772 |
| 2016/0273400 A1 | * | 9/2016 | Ekanayake | F01K 23/10 |
| 2017/0016399 A1 | | 1/2017 | Bedrine et al. | |

OTHER PUBLICATIONS

Daniel Bernard Kupratis, "Crossover Cooling Flow for Multi-Engine Systems" dated Jun. 19, 2018 in U.S. Appl. No. 16/012,295.

* cited by examiner

Primary Examiner — Christopher Verdier
Assistant Examiner — Elton K Wong
(74) Attorney, Agent, or Firm — Snell & Wilmer L.L.P.

(57) ABSTRACT

An airfoil cooling system may include an airfoil that defines a first cooling chamber and a second cooling chamber. The first cooling chamber may be configured to receive a first cooling airflow from a first fluid source and the second cooling chamber may be configured to receive a second cooling airflow from a second fluid source that is different from the first fluid source. The airfoil may be a vane of a gas turbine engine. For example, the vane may be a first vane of a plurality of vanes of a turbine section of the gas turbine engine. The first cooling chamber may be a leading edge chamber of the first vane and the second cooling chamber may be an aft chamber of the first vane that is positioned aft of the leading edge chamber.

16 Claims, 6 Drawing Sheets

AIRFOIL COOLING SYSTEM

FIELD

The present disclosure relates to airfoil cooling systems, and more specifically to airfoils having cooling airflow supplied from different sources.

BACKGROUND

Airfoils, such as vanes in a turbine section of a gas turbine engine, are often configured to have an airflow routed through one or more internal chambers thereof in order to provide cooling to the airfoil. Maintaining sufficient cooling flow through these airfoils helps protect the structural integrity of the airfoils and may help to prevent thermally induced degradation of the material of airfoil. Accordingly, operating parameters of the system in which the airfoil is implemented, such as a gas turbine engine, may be dependent on these cooling flows. Said differently, maintaining proper cooling flows may dictate, at least to a certain degree, the operating condition of the system in which the airfoil is implemented (e.g., the gas turbine engine), which may lead to fuel inefficiencies and/or may limit the operating modes of the system.

SUMMARY

In various embodiments, the present disclosure provides an airfoil cooling system. The airfoil cooling system includes an airfoil that defines a first cooling chamber and a second cooling chamber. The first cooling chamber may be configured to receive a first cooling airflow from a first fluid source and the second cooling chamber may be configured to receive a second cooling airflow from a second fluid source that is different from the first fluid source.

In various embodiments, the airfoil is a vane of a gas turbine engine. For example, the vane may be a first vane of a plurality of vanes of a turbine section of the gas turbine engine. The plurality of vanes forms a first turbine stage of the turbine section of the gas turbine engine, according to various embodiments. In various embodiments the first turbine stage of the turbine section is a forward-most row of vanes of the turbine section. The first cooling chamber may be a leading edge chamber of the first vane and the second cooling chamber may be an aft chamber of the first vane that is positioned aft of the leading edge chamber.

In various embodiments, the gas turbine engine is a first gas turbine engine of a multi-engine system, the first fluid source comprises a first compressor of the first gas turbine engine, and the second fluid source comprises a second compressor of a second gas turbine engine of the multi-engine system. In various embodiments, the second fluid source further includes the first compressor such that the second cooling airflow is supplied from both the first compressor and the second compressor. In various embodiments, the first fluid source consists of the first compressor.

In various embodiments, the airfoil is a vane of a turbine section of a first gas turbine engine, the first fluid source comprises a section of the first gas turbine engine forward of the turbine section, and the second fluid source comprises at least one of a second gas turbine engine, a combination of the first gas turbine engine and the second gas turbine engine, and a supplemental compressed air supply. In various embodiments, the section comprises a compressor section of the first gas turbine engine.

Also disclosed herein, according to various embodiments, is a gas turbine engine that includes a turbine section comprising a vane. The vane may define a first cooling chamber and a second cooling chamber, the first cooling chamber may be configured to receive a first cooling airflow from a first fluid source, and the second cooling chamber may be configured to receive a second cooling airflow from a second fluid source that is different from the first fluid source.

Also disclosed herein, according to various embodiments, is a multi-engine system. The multi-engine system may include a first gas turbine engine having a first compressor and a first turbine. The first turbine may include a vane row having a plurality of vanes, wherein a vane of the plurality of vanes defines a leading edge chamber and an aft chamber aft of the leading edge chamber. The first gas turbine engine may have a intra-engine cooling network configured to route a resident airflow from forward of the first turbine to the leading edge chamber of the vane of the plurality of vanes of the vane row. The multi-engine system may also include a second gas turbine engine comprising a second compressor and a second turbine. Still further, the multi-engine system may have a first crossover cooling network configured to route a first crossover airflow from the first compressor of the first gas turbine engine to the second turbine of the second gas turbine engine and a second crossover cooling network configured to route a second crossover airflow from the second compressor of the second gas turbine engine to the aft chamber of the vane of the first turbine of the first gas turbine engine.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Figure 2:
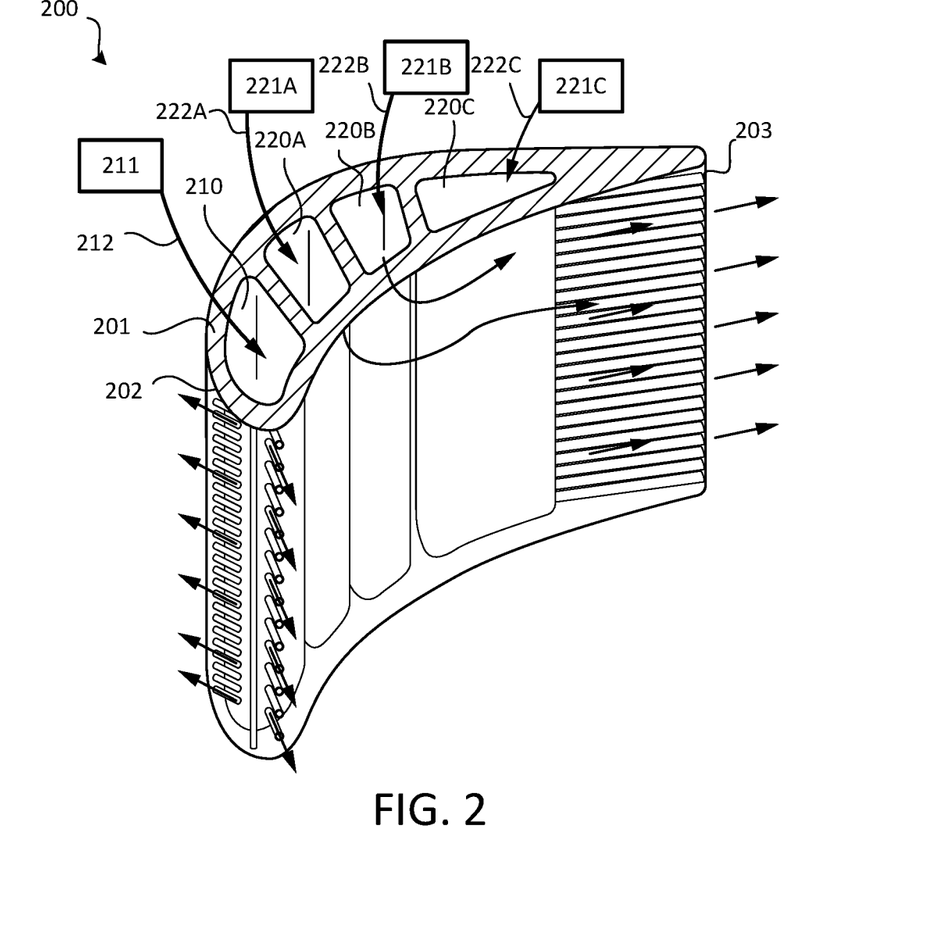
FIG. 2 is a cross-sectional view of an airfoil cooling system, with various components of the system shown schematically, in accordance with various embodiments.

Disclosed herein, according to various embodiments and with momentary reference to FIG. 2, is an airfoil cooling system 200 in which cooling airflow is supplied to the an airfoil 201 from a plurality (e.g., two or more) cooling airflow sources 211, 221A, 221B, 221C. More details pertaining to this airfoil cooling system 200 are included below with reference to FIGS. 2-4. While numerous details and embodiments herein pertain to utilizing the airfoil cooling system 200 as a vane cooling circuit in a gas turbine engine, such as an engine of a rotorcraft (e.g., a helicopter), the scope of the disclosure is not necessarily limited to vane cooling implementations of gas turbine engines for rotor craft, and thus the airfoil cooling system may be implemented in power generation applications, vehicles, other aircraft, etc.

Figure 1:
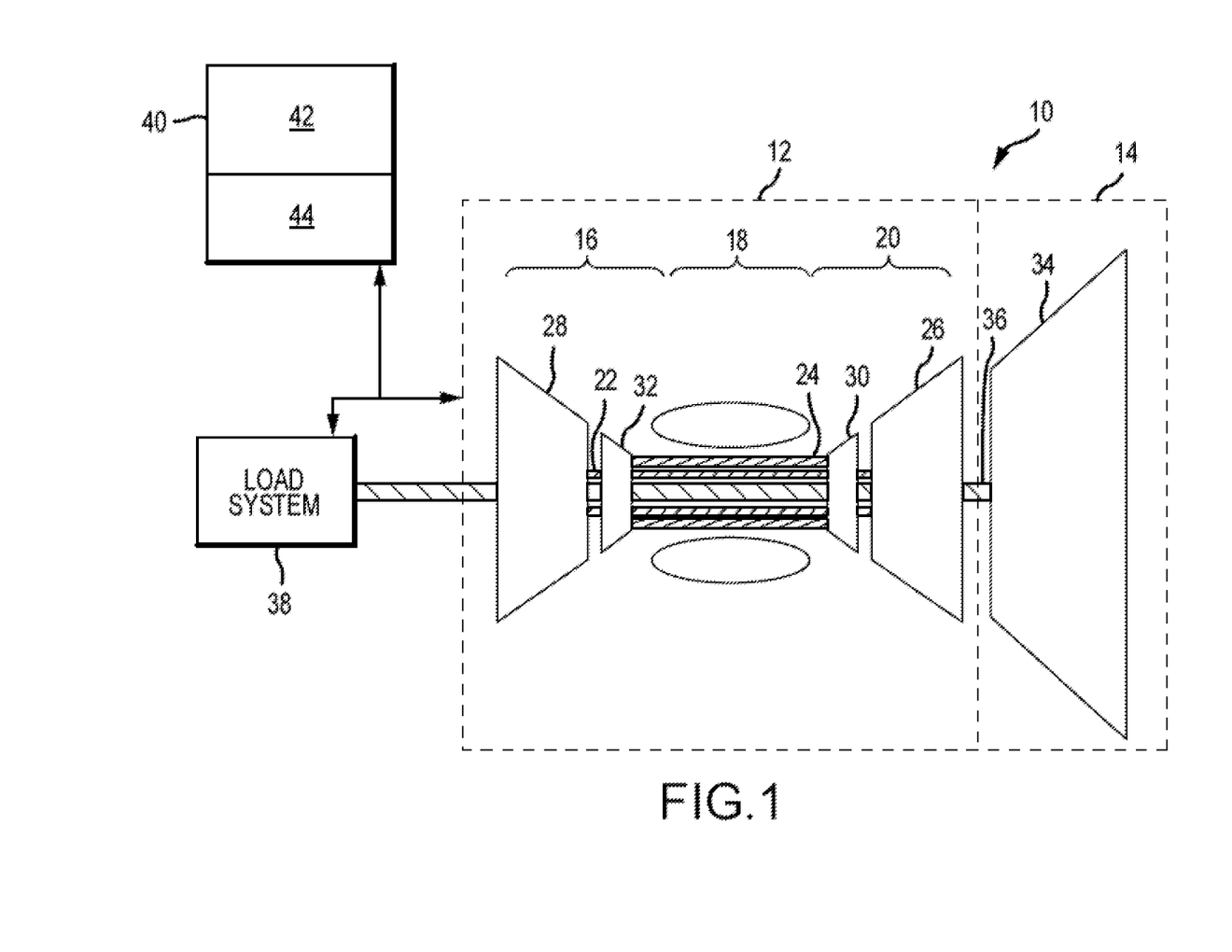
FIG. 1 is a schematic cross-sectional view of an exemplary gas turbine engine, in accordance with various embodiments.

Referring now to FIG. 1 and according to various embodiments, an exemplary gas turbine engine 10 is shown. As described in greater detail below, the airfoil cooling system 200 (FIG. 2) provided herein may be utilized in a gas turbine engine 10, such as the one described with reference to FIG. 1, and/or the airfoil cooling system 200 may be utilized in a multi-engine system 100, such as the one described with reference to FIGS. 5 and 6. Briefly, the multi-engine system 100 may include multiple gas turbine engines, such as exemplary gas turbine engine 10, or the multi-engine system may include engines that are not identical. In various embodiments, the gas turbine engine 10 is a turboshaft engine, such as can be used in an aircraft application, such as a helicopter. In various embodiments, the gas turbine engine 10 comprises a gas generator 12 and/or a power turbine 14 arranged in a series flow with an upstream inlet proximate the gas generator 12 and a downstream exhaust proximate the power turbine 14.

In various embodiments, the gas generator 12 includes a compressor section 16 where air is compressed/pressurized, a combustor section 18 downstream of the compressor section 16 where the compressed air is mixed with fuel and ignited to generate hot combustion gases, and a turbine section 20 downstream of the combustor section 18 for extracting power from the hot combustion gases, such as by causing the blades of a turbine to rotate.

In various embodiments, the gas generator 12 further comprises a multi-spool coaxially nested configuration, including a low pressure spool 22 and a high pressure spool 24. In various embodiments, the low pressure spool 22 and the high pressure spool 24 operate in different directions, as well as at different pressures, speeds, and/or temperatures. In various embodiments, a low pressure turbine 26 is mounted to the low pressure spool 22 to drive a low pressure compressor 28, and a high pressure turbine 30 is mounted to the high pressure spool 24 to drive a high pressure compressor 32. As used herein, "low pressure" components generally experience lower pressures than corresponding "high pressure" components when the gas turbine engine 10 operates.

In various embodiments, the power turbine 14 comprises a turbine 34 (e.g., a "power turbine") mounted to a turbine spool 36. In operation, the gas generator 12 generates combustion gases that impart torque to the turbine spool 36 through the turbine 34. In various embodiments, the turbine spool 36 drives a load system 38, such as an electrical generator, power turbine, propeller, rotor, pump system, etc.

The airfoil cooling system, according to various embodiments and with reference to FIG. 2, generally includes an airfoil 201 having multiple internal cooling chambers defined therein. For example, the airfoil may have a first cooling chamber 210 and a second cooling chamber 220A, and each cooling chamber may be configured to receive a respective cooling airflow from different fluid sources. That is, the first cooling chamber 210 may be configured to receive a first cooling airflow 212 from a first fluid source 211 and the second cooling chamber 220A may be configured to receive a second cooling airflow 222A from a second fluid source 221A. These different fluid sources 211, 221A may be supplies of compressed air and, as described below, may be from different portions of the same gas turbine engine, from different gas turbine engines, or from one or more auxiliary/supplement compressed air sources.

In various embodiments, the airfoil 201 may be a vane of a gas turbine engine, and/or the vane may be a first vane of a plurality of vanes of a turbine section of the gas turbine engine. For example, and with momentary reference to FIG. 4, two adjacent vanes 401A, 401B may form a section/portion of a circumferential array of vanes that collectively form a first vane row 405 or a first vane stage of the gas turbine engine. In various embodiments, the vane row 405 may be a forward-most vane row of a turbine section of the gas turbine engine, and may thus be directly downstream (aft) of the combustor. In various embodiments, this first vane row 405 may experience an especially high temperature, and thus maintaining sufficient cooling to this first vane row 405 may be a priority.

In various embodiments, and with renewed reference to FIG. 2, the first cooling chamber 210 of the airfoil 201 may be a leading edge chamber. That is, the airfoil 201 may have a leading edge 202 that is generally situated as a forward-most portion of the airfoil in a gas turbine engine, and the first cooling chamber 210 (e.g., the leading edge chamber) may extend along the leading edge 202 of the airfoil 201. As mentioned above, the airfoil 201 has a second cooling chamber 220A, and this second cooling chamber 220A may be aft of the leading edge chamber. In various embodiments, the airfoil 201 defines multiple aft cooling chambers 220A, 220B, and 220C that are supplied respective cooling airflows 222A, 222B, and 222C from respective fluid sources 221A, 221B, 221C (shown schematically in FIG. 2). The first cooling airflow 212 supplied to the first cooling chamber 210, which may be the leading edge chamber, may flow out of leading edge cooling holes (also referred to as showerhead-type holes) that provide cooling to the exterior surface of the airfoil 201. The one or more aft cooling chambers 220A, 220B, 220C may also deliver the respective cooling airflow to pressure or suction side cooling holes, and/or the aft cooling chambers may deliver the cooling airflow out a trailing edge 203 of the airfoil 201.

While conventional airfoils are cooled via bleed air from the compressor section of the same gas turbine engine, the airfoil cooling system 200 disclosed herein may include a cooling network that routes cooling air from different sources (e.g., other than compressor bleed from its own engine), thereby potentially reducing the volume of cooling airflow that the gas turbine engine would otherwise need to supply to the airfoil 201 to maintain proper cooling, and thus enabling the gas turbine engine to operate in different operating modes, such as a below a conventional, self-sustaining idle point.

In various embodiments, two gas turbine engines may be utilized to power a vehicle or other system (e.g., a multi-engine system 100 described below), and the first fluid source 211 that delivers the first cooling airflow 212 to the first cooling chamber 210 may be a compressor or a diffuser-combustor of its own gas turbine engine (e.g., a first gas turbine engine). The second fluid source 221A that delivers the second cooling airflow 222A to the second cooling chamber 220A may be a compressor or a diffuser-combustor from another gas turbine engine (e.g., a second gas turbine engine). Thus, as described below with reference to the multi-engine system 100 of FIGS. 5 and 6, a crossover cooling network may exist between the two gas turbine engines to enable this inter-engine cooling flow.

Figure 3:
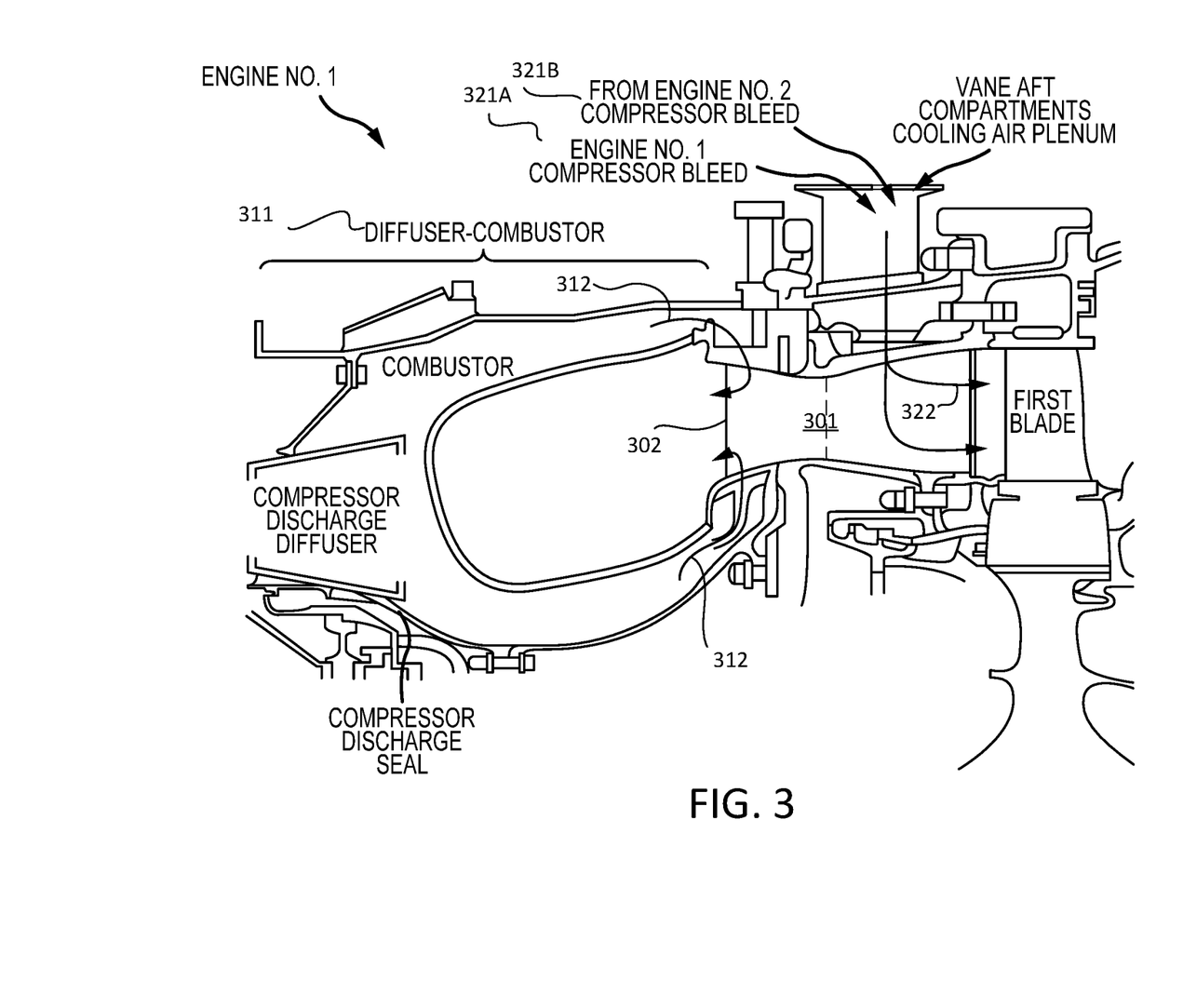
FIG. 3 is a cross-sectional view of a portion of a gas turbine engine having an airfoil cooling system, in accordance with various embodiments.

In various embodiments, and with reference to FIG. 3, the first fluid source 311 may be a diffuser-combustor 311 and the first cooling airflow 312 may be delivered to one or more of the forward-most vanes 301 to be emitted from vane 301 via cooling holes positioned along the leading edge 302 of the vane 301. In various embodiments, the second fluid source may be a combination of two different supplies. That is, the second fluid source may include supplies from two engines 321A, 321B, and thus the second cooling airflow 322 may be a mixture of air from the gas turbine engine (e.g. a first gas turbine engine) of which the airfoil 201 is a component as well as from another gas turbine engine (e.g., from a second gas turbine engine). In various embodiments, the second fluid source may be a stand-alone, auxiliary, and/or supplemental compressed air supply.

Figure 4:
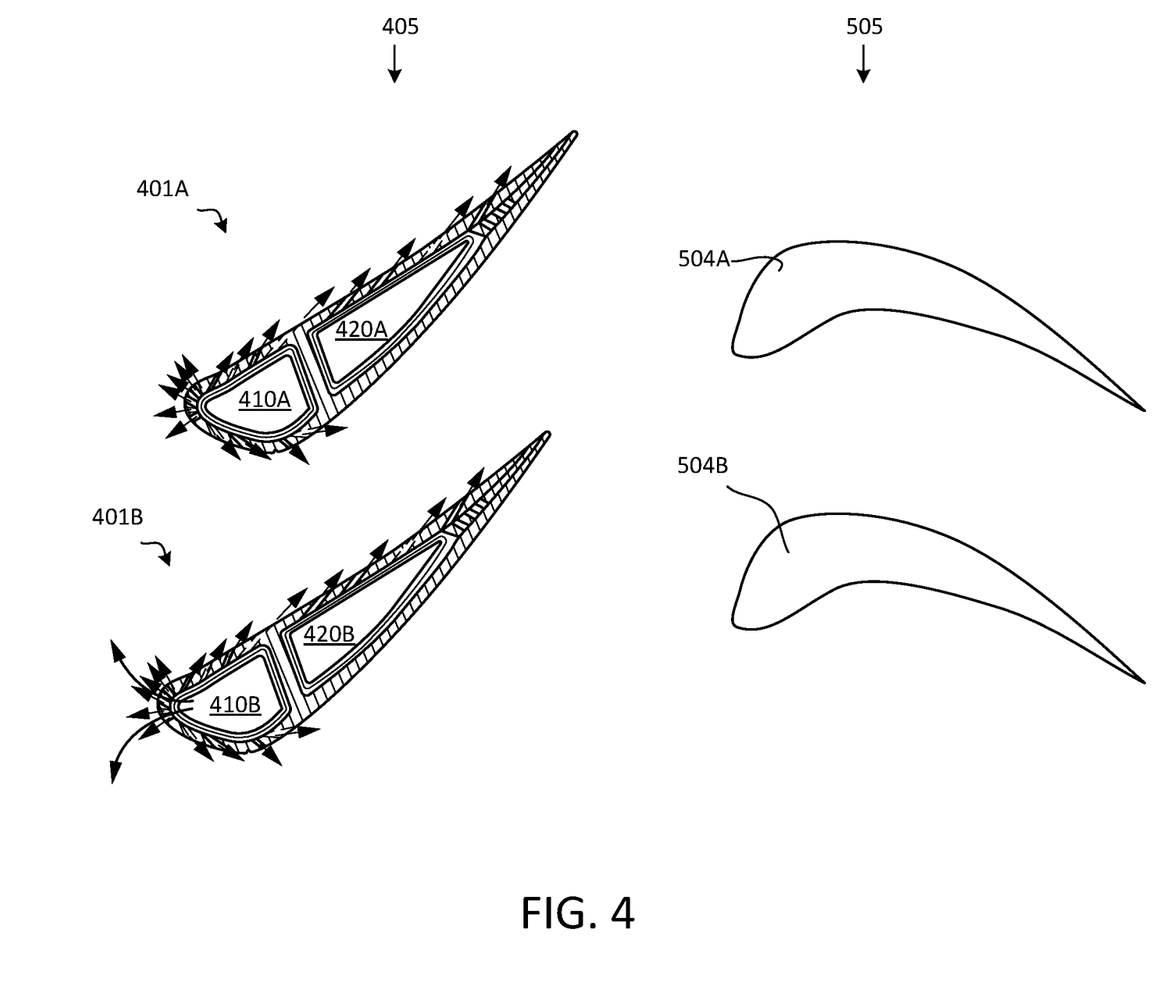
FIG. 4 shows a cross-sectional view of two vanes of a vane row (e.g., vane stage) of a turbine section and a top view of two blades of a blade row (e.g., a blade stage) of the turbine section of a gas turbine engine, in accordance with various embodiments.

In various embodiments, and with reference to FIG. 4, a first vane row 405 of a gas turbine engine may include multiple vanes 401A, 401B distributed circumferentially around an engine central longitudinal axis of the gas turbine engine. The leading edge chambers 410A, 410B may be supplied with a first cooling airflow from a first fluid source, such as a section of the gas turbine engine that is forward/upstream of the turbine, and the aft cooling chambers 420A, 420B may be supplied with a second cooing airflow from a second fluid source, such as an inter-engine flow of cooling air from a different engine or from an auxiliary/supplemental source. FIG. 4 also shows a first blade stage 505 with adjacent blades 504A, 504B downstream of the first vane row 405.

Figure 5:
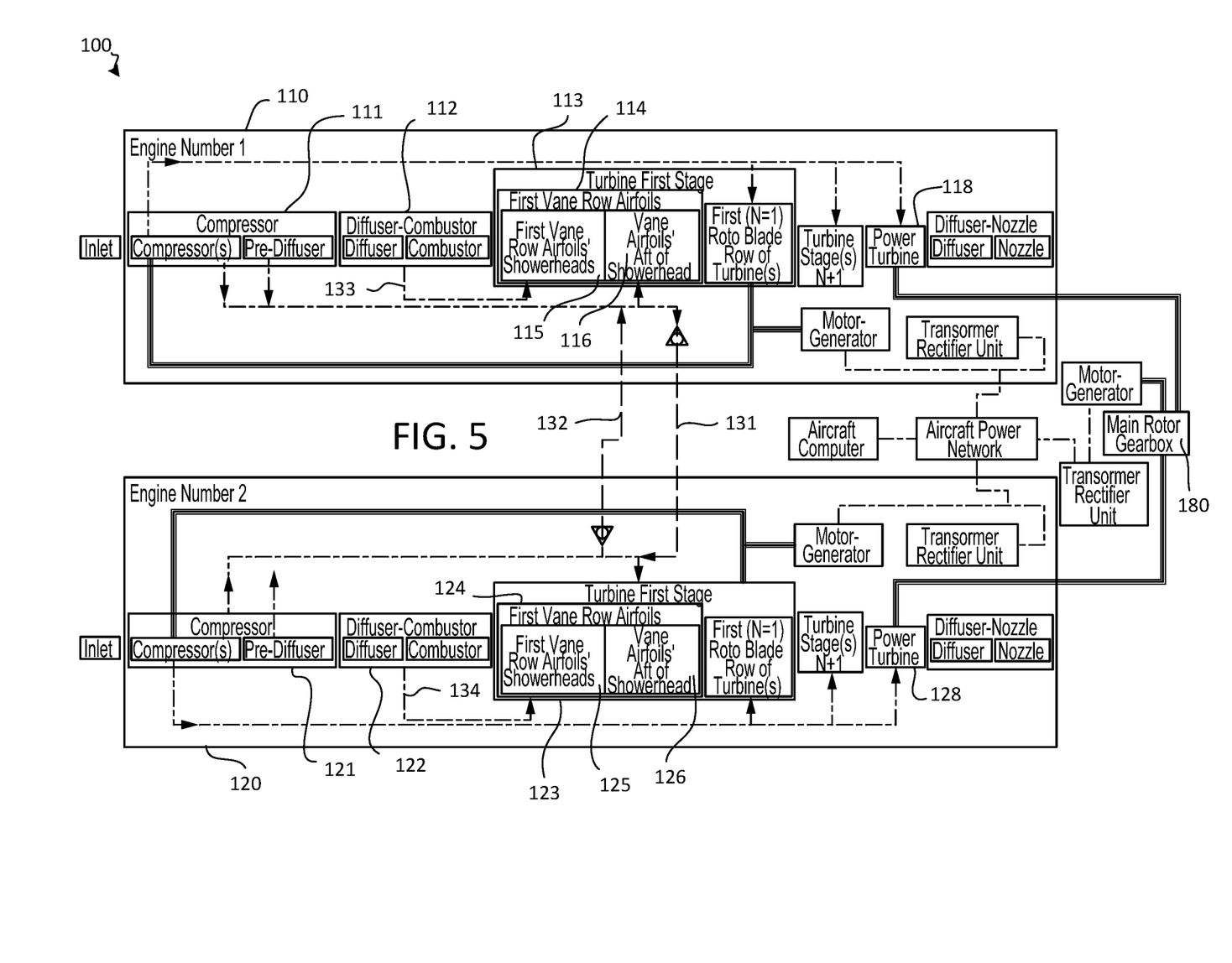
FIG. 5 is a schematic view of a multi-engine system having crossover cooling flow networks, in accordance with various embodiments.
Figure 6:
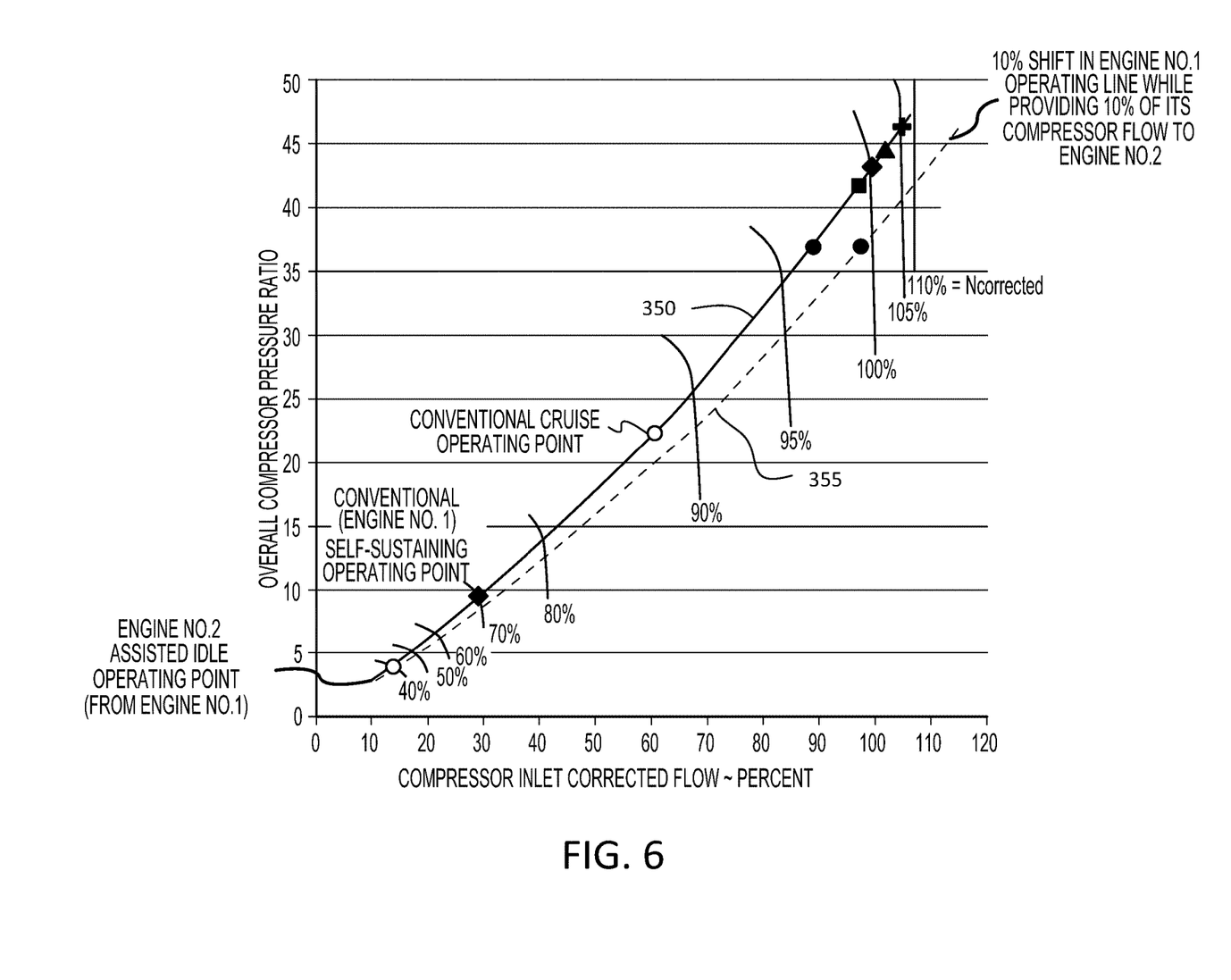
FIG. 6 is a graph showing operating lines of a multi-engine system, in accordance with various embodiments.

In various embodiments, and with reference to FIGS. 5 and 6, a multi-engine system 100 is provided. Each gas turbine engine 10 may have a controller 40 configured to control the multi-engine system 100 (FIG. 5) and/or each gas turbine engine 10. Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In re Nuijten to fall outside the scope of patentable subject matter under 35 U.S.C. § 101.

In various embodiments, the controller 40 comprises a Full-Authority Digital Engine Control (FADEC) system for use with an aircraft gas turbine engine 10. In various embodiments, the controller 40 includes one or more processors 42 and one or more tangible, non-transitory memories 44 configured to implement digital or programmatic logic. In various embodiments, for example, the one or more processors 42 comprise one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof and/or the like, and the one or more tangible, non-transitory memories 44 store instructions that are implemented by the one or more processors 42 for performing various functions, such as the systems and methods of the inventive arrangements described herein.

In various embodiments, and with reference to FIGS. 5 and 6, the multi-engine system 100 is provided. The multi-engine system 100 generally includes a first gas turbine engine 110 and a second gas turbine engine 120. Each gas turbine engine 110, 120, which may be the same as or similar to gas turbine engine 10 described above with reference to FIG. 1, has a compressor 111, a diffuser-combustor 112, a turbine 113, etc., according to various embodiments. That is, the first gas turbine engine 110 may have a first compressor 111, a first diffuser-combustor 112, and a first turbine 113 and the second gas turbine engine 120 may have a second compressor 121, a second diffuser-combustor 122, and a second turbine 123. The first and second gas turbine engines 110, 120 may each include a power turbine—first gas turbine engine 110 may include a first power turbine 118 and the second gas turbine engine may include a second power turbine 128—and these power turbines may both be mechanically coupled, for example, to a main rotor gearbox of a rotorcraft.

The multi-engine system 100 may further include a first crossover cooling network 131 and a second crossover cooling network 132. Generally, these crossover cooling networks 131, 132 are configured to create inter-engine cooling flow between the first and second gas turbine engines 110, 120. That is, the first crossover cooling network 131 may be configured to route a first crossover airflow from the first compressor 111 of the first gas turbine engine 110 to the second turbine 123 of the second gas turbine engine 120 and the second crossover cooling network 132 may be configured to route a second crossover airflow from the second compressor 121 of the second gas turbine engine 120 to the first turbine 113 of the first gas turbine engine 110. As described in greater detail below with reference to the various operating modes of the multi-engine system 100, the dual crossover cooling networks 131, 132 enable the inter-engine transfer of flow energy (e.g., enthalpy) in order to enable asymmetric operation of the gas turbine engines 110, 120, which may result in overall improved fuel efficiency of the multi-engine system 100. While numerous details and embodiments are included herein pertaining to a configuration of two gas turbine engines 110, 120, the multi-engine system 100 may include more than two engines (e.g., three or more).

In various embodiments, the first and second crossover cooling networks 131, 132 each comprises a series of tubes, pipes, channels, chambers, plenums, etc., for directing cooling airflow from the compressor of one gas turbine engine to the turbine of the other gas turbine engine. The first and second crossover airflows that flow through the first and second crossover cooling networks 131, 132, respectively, may be a percentage of total compressor flow. That is, the first crossover airflow being routed via the first crossover cooling network 131 may comprise between about 5% and about 20% of a first total compressor flow through the first compressor 111 and the second crossover airflow being routed via the second crossover cooling network 132 may similarly comprises between about 5% and about 20% of a second total compressor flow through the second compressor 121. In various embodiments, the first crossover airflow is about 10% of the first total compressor flow through the first compressor 111 and the second crossover airflow is about 10% of the second total compressor flow through the second compressor 121. As used in this context, the term "about" refers to plus or minus 2%.

As used herein, the term "crossover airflow" refers to the cooling air from the compressors of one of the gas turbine engines that is configured to crossover (i.e., flow) from one engine to the other. Accordingly, the term "first crossover airflow" refers to the air being directed inter-engine (e.g., from the first gas turbine engine 110 to the second gas turbine engine 120) via the first crossover cooling network 131 and the term "second crossover airflow" refers to the air being directed inter-engine (e.g., from the second gas turbine engine 120 to the first gas turbine engine 110) via the second crossover cooling network 132. Thus, while each of the first and second crossover cooling networks 131, 132 shown in FIG. 5 has a split that allows the cooling air to flow to the other engine or to flow directly to its own engine's turbine, the term "crossover airflow" refers only to the portion that that actually transfers between engines and does not refer to the flow of air that returns back to the same engine from which it was diverted. Accordingly, each crossover cooling network 131, 132 may initially (e.g., at or near the inlet of the crossover cooling network where cooling air is diverted from the compressor) have between about 10% and about 40% of the total compressor flow being directed there-through, which may be divided downstream so that between about 5% and about 20% (relative to the total compressor flow) flows to the other gas turbine engine (the "crossover airflow"), with the other portion (5%-20%) flowing to the turbine of the same engine from which it was diverted. In various embodiments, each crossover cooling network 131, 132 may initially (e.g., at or near the inlet of the crossover cooling network where cooling air is diverted from the compressor) have between about 15% and about 30% of the total compressor flow being directed there-through. In various embodiments, each crossover cooling network 131, 132 may initially (e.g., at or near the inlet of the crossover cooling network where cooling air is diverted from the compressor) have about 10% of the total compressor flow being directed there-through. As used in this context only, the term "about" refers to plus or minus 2%. Accordingly, in various embodiments, vanes of the turbine of one of the gas turbine engines may be configured to be supplied with cooling airflow from its own compressor and from the other gas turbine engine. Additional details pertaining to the relative flows of cooling airflow are included below with reference to exemplary operating modes of the multi-engine system 100.

In various embodiments, the first crossover cooling network 131 extends from the first compressor 111 of the first gas turbine engine 110 to a second vane row 124 (no ordinal or positional meaning is intended for the term "second" in this context) of the second turbine 123 of the second gas turbine engine 120. Similarly, the second crossover cooling network 132 may extend from the second compressor 121 of the second gas turbine engine 120 to a first vane row 114 of the first turbine 113 of the first gas turbine engine 110. In various embodiments, the second vane row 124 is a second forward-most vane row of the second turbine 123 and the first vane row 114 is a first forward-most vane row of the first turbine 113. Said differently, the vanes to which the crossover airflows are directed may be the vanes immediately downstream (e.g., aft) of the diffuser-combustor 112, 122 which are subjected to comparatively higher temperatures, according to various embodiments.

In various embodiments, the first forward-most vane row (e.g., 114) of the first turbine 113 comprises a plurality of first vanes, wherein each first vane of the plurality of first vanes defines a first leading edge chamber 115 and a first body chamber 116 that is aft of the first leading edge chamber 115. The second crossover cooling network 132 may be configured to route the second crossover airflow to the first body chamber 116 and may not direct the second crossover airflow to the first leading edge chamber 115. In such a configuration, the first leading edge chamber 115 may be supplied with a first resident airflow via a first intra-engine cooling network 133. That is, the first leading edge chamber 115, which may have an array of cooling holes (e.g., also referred to as a "showerhead"-type array of cooling holes) along or adjacent the leading edge of the airfoil shape of the first vanes, may be fluidly isolated from the second crossover flow and may instead be supplied by its own engine's cooling flow, referred to herein as first resident airflow, via the first intra-engine cooling network 133. Correspondingly, the second forward-most vane row (e.g., 124) of the second turbine 123 comprises a plurality of second vanes, wherein each second vane of the plurality of second vanes defines a second leading edge chamber 125 and a second body chamber 126 that is aft of the second leading edge chamber 125. The first crossover cooling network 131 may be configured to route the first crossover airflow to the second body chamber 126 and may not direct the first crossover airflow to the second leading edge chamber 125. In such a configuration, the second leading edge chamber 125 may be supplied with a second resident airflow via a second intra-engine cooling network 134. That is, the second leading edge chamber 125, which may have "showerhead-type" cooling holes along or adjacent the leading edge of the airfoil shape of the second vanes, may be fluidly isolated from the first crossover flow and may instead be supplied by its own engine's cooling flow, referred to herein as second resident airflow, via the second intra-engine cooling network 134. Each of the gas turbine engines 110, 120 may also have other intra-engine cooling networks, and/or the described cooling networks may be routed through various portions of the respective engines.

In various embodiments, and with reference to FIG. 6, a conventional operating line 350 of a gas turbine engine is provided, as well as a modified operating line 355 of a gas turbine engine that has been configured to provide crossover flow to another gas turbine engine. In various embodiments, the gas turbine engines 110, 120 of the multi-engine system 100 have been designed and/or configured to have extra cooling flow capacity (as indicated by the modified operating line 355). The conventional operating line 350 shows a conventional cruise operating point as well as a conventional self-sustaining idle point that represents the lowest operating conditions of a gas turbine engine while still maintaining a self-sufficient idle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil cooling system comprising:
    an airfoil of a first gas turbine engine of a multi-engine system, the multi-engine system comprising a second gas turbine engine, the airfoil defining a first cooling chamber and a second cooling chamber;
    a second airfoil of the second gas turbine engine, the second airfoil defining a third cooling chamber;
    wherein the first cooling chamber is configured to receive a first cooling airflow from a first fluid source, wherein the first fluid source is a first compressor of the first gas turbine engine such that the first cooling airflow is pressurized air from the first compressor that flows to the first cooling chamber;
    wherein the second cooling chamber is configured to receive a second cooling airflow from a second fluid source, wherein the second fluid source is a second compressor of the second gas turbine engine such that the second cooling airflow is pressurized air from the second compressor that flows from the second compressor of the second gas turbine engine to the second cooling chamber of the airfoil of the first gas turbine engine; and
    wherein the third cooling chamber is configured to receive a third cooling airflow from the first fluid source, wherein the third cooling airflow is pressurized air from the first compressor that flows from the first compressor of the first gas turbine engine to the third cooling chamber of the second airfoil of the second gas turbine engine.

2. The airfoil cooling system of claim 1, wherein the airfoil is a vane of the first gas turbine engine.

3. The airfoil cooling system of claim 2, wherein the vane is a first vane of a plurality of vanes of a turbine section of the first gas turbine engine.

4. The airfoil cooling system of claim 3, wherein the plurality of vanes forms a first turbine stage of the turbine section of the first gas turbine engine.

5. The airfoil cooling system of claim 4, wherein:
the first turbine stage of the turbine section is a forward-most row of vanes of the turbine section;
the first cooling chamber is a leading edge chamber of the first vane; and
the second cooling chamber is an aft chamber of the first vane that is positioned aft of the leading edge chamber.

6. The airfoil cooling system of claim 1, wherein the second cooling airflow is pressurized from both the second compressor of the second gas turbine engine and the first compressor of the first gas turbine engine.

7. The airfoil cooling system of claim 6, wherein the first cooling airflow is configured to flow via a first intra-engine cooling network directly from the first compressor to the first cooling chamber.

8. The airfoil cooling system of claim 7, wherein the second fluid source is a combination of the first compressor and the second compressor such that the second cooling airflow is configured to flow directly from both the first compressor and the second compressor to the second cooling chamber.

9. A multi-engine system comprising:
a first gas turbine engine comprising a first compressor section and a turbine section, wherein the first compressor section includes a first compressor, wherein the turbine section comprises an airfoil defining a first cooling chamber and a second cooling chamber;
a second gas turbine engine comprising a second compressor section and a second turbine section, wherein the second compressor section includes a second compressor, wherein the second turbine section comprises a second airfoil defining a third cooling chamber;
wherein the first cooling chamber is configured to receive a first cooling airflow pressurized from the first compressor;
wherein the second cooling chamber is configured to receive a second cooling airflow pressurized from the second compressor and routed directly from the second compressor of the second gas turbine engine via a crossover cooling network to the second cooling chamber of the airfoil;
wherein the third cooling chamber is configured to receive a third cooling airflow pressurized from the first compressor and routed directly from the first compressor of the first gas turbine engine via a second crossover cooling network to the third cooling chamber of the second airfoil.

10. The multi-engine system of claim 9, wherein the airfoil is a first airfoil of a plurality of airfoils of the turbine section of the first gas turbine engine.

11. The multi-engine system of claim 10, wherein the plurality of airfoils forms a first turbine stage of the turbine section of the first gas turbine engine.

12. The multi-engine system of claim 11, wherein the first turbine stage of the turbine section is a forward-most row of vanes of the turbine section.

13. The multi-engine system of claim 12, wherein:
the first cooling chamber is a leading edge chamber of the first airfoil; and
the second cooling chamber is an aft chamber of the first airfoil that is positioned aft of the leading edge chamber.

14. The multi-engine system of claim 9, wherein the second cooling airflow is routed through the crossover cooling network.

15. A multi-engine system comprising:
a first gas turbine engine comprising a first compressor and a first turbine, wherein the first turbine comprises a first vane row comprising a first plurality of vanes, wherein a first vane of the first plurality of vanes defines a first leading edge chamber and a first aft chamber aft of the first leading edge chamber, wherein the first gas turbine engine comprises a first intra-engine cooling network configured to route a first resident airflow from forward of the first turbine to the first leading edge chamber of the first vane of the first plurality of vanes of the first vane row;
a second gas turbine engine comprising a second compressor and a second turbine, wherein the second turbine comprises a second vane row comprising a second plurality of vanes, wherein a second vane of the second plurality of vanes defines a second leading edge chamber and a second aft chamber aft of the second leading edge chamber, wherein the second gas turbine engine comprises a second intra-engine cooling network configured to route a second resident airflow from forward of the second turbine to the second leading edge chamber of the second vane of the second plurality of vanes of the second vane row;
a first crossover cooling network configured to route a first crossover airflow from the first compressor of the first gas turbine engine to the second aft chamber of the second vane of the second turbine of the second gas turbine engine; and
a second crossover cooling network configured to route a second crossover airflow from the second compressor of the second gas turbine engine to the first aft chamber of the first vane of the first turbine of the first gas turbine engine.

16. The multi-engine system of claim 15, wherein the first vane row is a first forward-most vane row of the first turbine.

* * * * *